March 31, 1925.  1,531,504
F. T. ROBERTS
PROCESS OF MAKING ARTICLES OF CELLULOID AND SIMILAR MATERIAL
Filed July 11, 1921   3 Sheets-Sheet 1
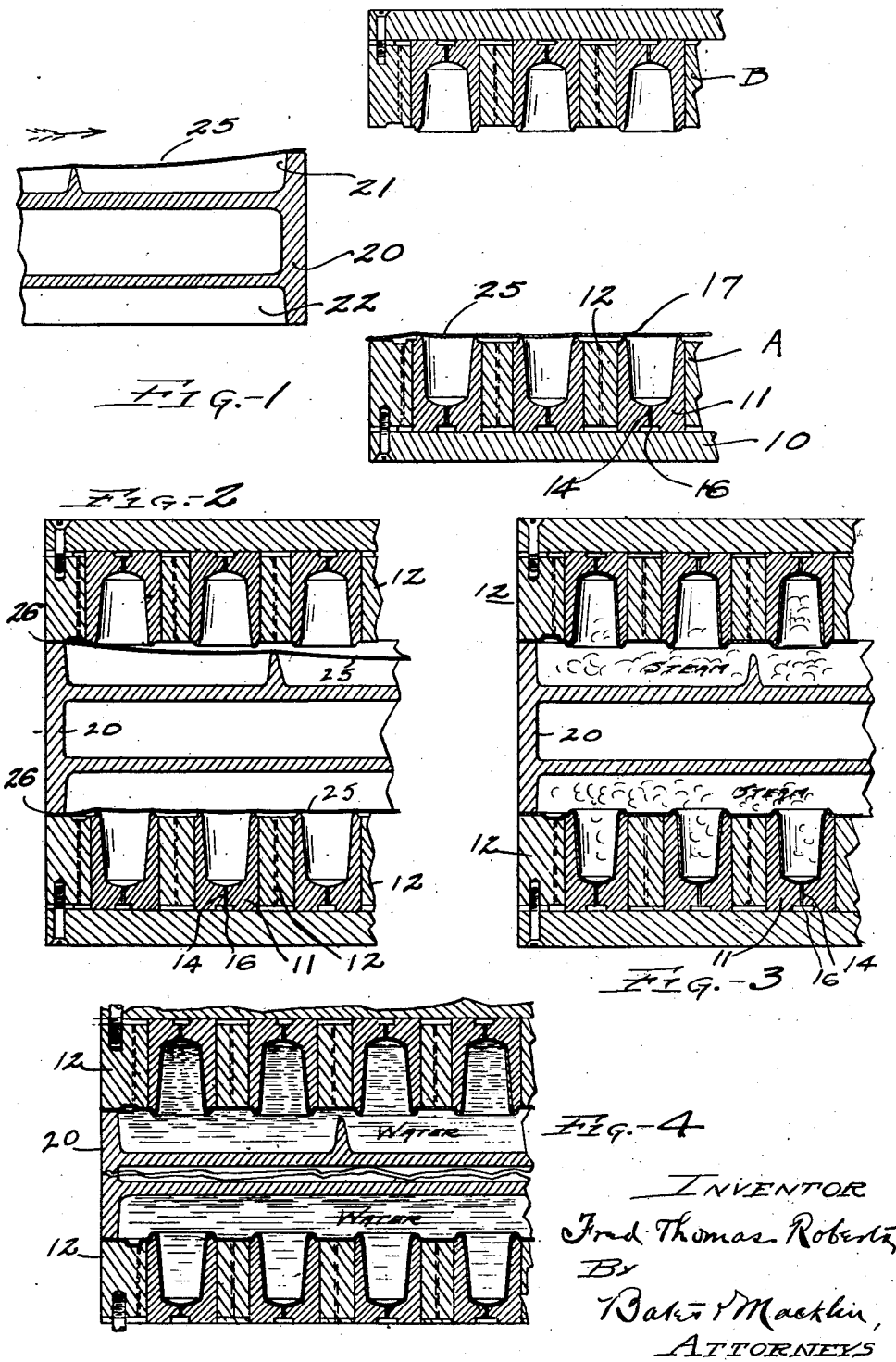

March 31, 1925.                                              1,531,504
                        F. T. ROBERTS
      PROCESS OF MAKING ARTICLES OF CELLULOID AND SIMILAR MATERIAL
                     Filed July 11, 1921        3 Sheets-Sheet 2
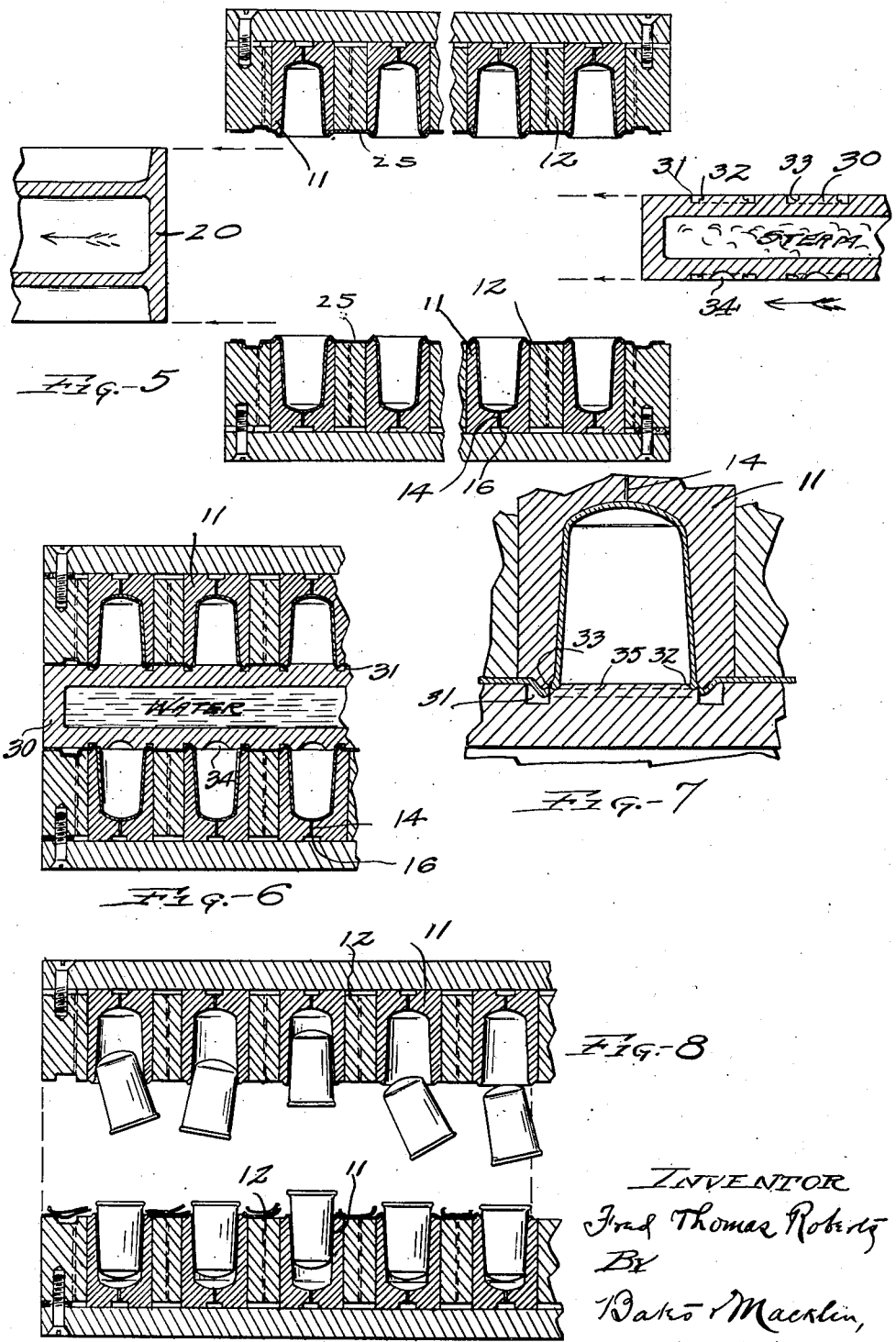

March 31, 1925.
F. T. ROBERTS
1,531,504
PROCESS OF MAKING ARTICLES OF CELLULOID AND SIMILAR MATERIAL
Filed July 11, 1921    3 Sheets-Sheet 3
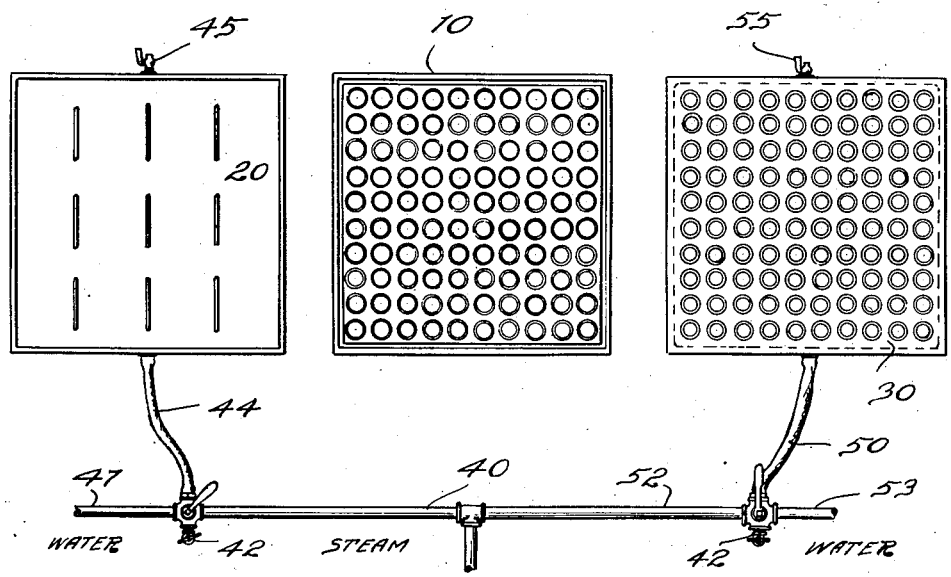
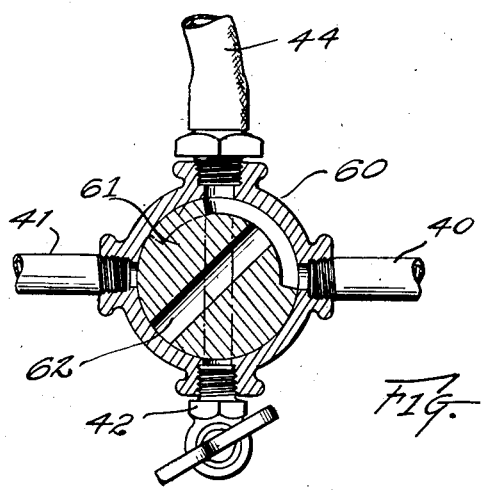

Patented Mar. 31, 1925.

1,531,504

UNITED STATES PATENT OFFICE.

FRED THOMAS ROBERTS, OF PHILADELPHIA, PENNSYLVANIA, ASSIGNOR TO PARAMOUNT RUBBER CONSOLIDATED, INC., OF TUCKAHOE, NEW YORK, A CORPORATION OF DELAWARE.

PROCESS OF MAKING ARTICLES OF CELLULOID AND SIMILAR MATERIAL.

Application filed July 11, 1921. Serial No. 483,703.

*To all whom it may concern:*

Be it known that I, FRED THOMAS ROBERTS, a citizen of the United States, residing at Philadelphia, in the county of Philadelphia and State of Pennsylvania, have invented a certain new and useful Improvement in Processes of Making Articles of Celluloid and Similar Material, of which the following is a full, clear, and exact description, reference being had to the accompanying drawings.

The object of this invention is to provide for the rapid and economical formation of hollow articles from sheets of celluloid or similar material.

A characteristic of the invention is that the material is rendered plastic and while in that condition is seated by fluid pressure in mold cavities, doing away with the necessity of male and female molds and the consequent requirement for accurate adjustment between the two to provide the proper thickness of wall. In the preferred manner of carrying out my invention I use steam as both the softening means and the means for supplying fluid pressure to seat the article, thus enabling the operation to be carried out simply and economically.

A feature of the invention provides for first rendering the sheet of celluloid plastic then shaping it to form the article and finally cooling it.

An additional feature of the invention is the provision whereby a celluloid sheet is not only heated and forced into a suitable mold cavity to form the article and then cooled, but the article is also severed from the sheet and the raw edges finished.

Further and additional objects will be apparent from the following description, taken in connection with the accompanying drawings, wherein Fig. 1 is a view showing a portion of a mold apparatus used in carrying out my process with the mold members separated, the steam chest being removed from between the mold members; Fig. 2 is a sectional view showing the mold members after the same has been brought together with the steam chest in position; Fig. 3 is a view similar to Fig. 2, showing the celluloid forced to its seat by steam pressure; Fig. 4 is a sectional view showing the step whereby the formed articles are cooled; Fig. 5 is a fragmentary sectional view showing the mold members after the steam chest has been removed; Fig. 6 is a sectional view showing the mold members brought together upon a hot plate; Fig. 7 is a sectional detail showing the manner of severing the individual articles from the sheet; Fig. 8 is a sectional view showing the hot plate removed. Fig. 9 is a diagrammatic plan illustrating the piping for conveying steam and water to the steam chest and hot plate and for draining them; Fig. 10 is a cross section of the three-way valve shown in Fig. 9.

Referring to the drawings by reference characters, I have shown at 10 the base of a mold plate provided with a plurality of individual mold members having cavities 11. The mold cavities are shown as separated by suitable spacing blocks 12.

An aperture 14 is provided in the lower portion of each mold cavity and this aperture communicates with a channel 16 which may be vented to the atmosphere. The upper end of each mold cavity may be provided with a cutting edge 17, as shown for a purpose to be later described.

The lower mold member A, Fig. 1, may rest upon the bead of a suitable hydraulic press, while the upper member B may be secured opposite the portion A. Any suitable type of press may be used, for instance the one shown in my prior Patent, No. 1,201,503, patented Oct. 17, 1916.

Cooperating with the mold members, I have shown a suitable steam chest 20. This steam chest comprises upper and lower cavities 21 and 22, each of which can be placed in communication by means of a three way valve with a suitable source of steam or water, or may be vented to drain, as desired. Fig. 9 shows a system of piping for this purpose. In this view 40 indicates a steam line, 41 a water line, 42 a drain pipe, 43 a three-way valve adapted to couple any of these conduits with a flexible pipe 44 leading to the chambers 21 and 22 of the steam chest. 45 indicates a bleeder or pet cock connected with each of these chambers.

My process may be carried out in the following manner. A sheet of celluloid or similar material 25 is placed over the lower series of mold cavities with the edges thereof extending approximately to the edge of said mold cavities. Upon the upper surface of the steam chest 20, I place a similar sheet of material. This being done the steam chest is moved between the opposite mold members and the hydraulic press operated to bring the mold members together upon the interposed steam chest.

The edges of the celluloid sheet being tightly clamped at the edges 26 to effect a seal, steam is admitted to the chambers 21 and 22. The steam serves to soften the celluloid sheet and when the latter has the proper consistency the steam pressure forces it into the individual mold cavities. The air in these mold cavities passes through the aperture 14 and channel 16 to the atmosphere.

When all of the individual articles have been seated in the mold cavities, water is turned into the channels 21 and 22, condensing the steam and at the same time serving to cool the celluloid articles formed therein.

It will be noted that at this stage of the process the individual articles which have been formed are united to the sheet at their top surfaces and in order to separate them from individual articles the following step may be taken.

The press is operated to separate the mold members after which the steam chest is withdrawn. A hot plate 30 is thereafter inserted between the mold members. The hot plate 30 is provided on its upper and lower surface with an annular channel 31, said channel terminating in an outwardly spaced rounded groove 32.

The groove 32 is separated from the channel 21 by a cutting edge 33. This cutting edge 33 coacts with the cutting edge 17 carried by the individual mold members 11 so that when the press is operated and the mold plates are forced upon the hot plate the latter serves to sever each individual hollow article about its periphery.

The hot plate 30 may have depressions 34 coaxial with the mold cavities for the reception of the water in the lower containers which is displaced by the projections on the hot plate. If it is desired to remove the water from the lower set of articles before the beading of the edge, the lower mold may be removed and inverted, the adherence of the said material to the mold surface allowing such operation.

The hot plate may be fed by means of a suitable piping and a three-way valve adapted to direct either steam or water to it and also to vent it. Fig. 9 illustrates at 50 a flexible pipe connected with a hot plate and leading to a three-way valve 51 which connects with a steam line 52, water line 53 or drain 54. 55 indicates a bleeder or pet cock on the hot plate. The valves 43 and 51 may be of any suitable form. They may be substantially identical and have the construction shown in Fig. 10 wherein 60 indicates the casing, 61 a valve plug and 62 a passageway through it.

The hot plate being sufficiently heated by the steam within it, is brought into contact with the annular edges of the seated material and co-operates with the cutting edges on the mold members to sever the material. At the same time the heat renders such material in this region more or less plastic so that the surplus celluloid is forced into the groove 32, thus a bead or protuberance is formed about the periphery of the hollow articles.

After the articles have been severed water is turned into the hot plate to cool the same, and after being sufficiently cooled the mold members are separated, the hot plate withdrawn and the finished articles are removed, as shown in Fig. 8.

It should be noted that the vents from the cavities and from the spaces between them and from the annular surrounding channel are of very small bore (being exaggerated in the drawings for clearness of illustration) so that the atmospheric air can only pass back of the inner surface of said stock very gradually. This characteristic, together with the adherence of the celluloid to the metal which results from the close contact provided in this method, allows ample time for the removal of the steam chest and hot plate and the draining of the article before material separation takes place between the seated stock and the mold surface.

The process described may be used for manufacturing a great number of hollow articles. I have shown it in the drawings as adapted to make a hollow celluloid article, such as a thimble, for example, although this is only illustrative of many of the uses of my process.

Having thus described my invention what I claim as new is:

1. The process of making hollow celluloid articles which consists in first rendering a sheet of celluloid plastic, then forcing said celluloid sheet against the wall of a mold cavity to make a hollow article, cooling said celluloid sheet, and thereafter severing the surplus stock from the edge of said article while retained in the same mold cavity.

2. The process of making hollow celluloid articles which consists in first rendering a sheet of celluloid plastic then forcing the plastic sheet into a mold cavity, cooling said celluloid sheet and forming a bead upon the periphery of said hollow article.

3. The process of making hollow celluloid articles which consists of heating and simultaneously seating the celluloid in a mold cavity to form an article, cooling said article, reheating a portion of said article, severing the surplus stock about the periphery of the article, and reforming the article adjacent the severing line.

4. The process of making celluloid articles which consists in first heating a sheet of celluloid, then forcing said celluloid sheet into a mold cavity to form an article, cooling said article and forming a bead upon the periphery of said article.

5. The process of making hollow celluloid articles which consists in first heating a sheet of celluloid, then forcing a portion of said celluloid sheet into a mold cavity to form an article, cooling said celluloid sheet, thereafter severing the stock from the edge of said article, in a mold cavity, and thereafter reheating a portion only of the article while it remains in such cavity.

6. The process of making hollow celluloid articles which consists of heating a sheet of celluloid and forming an article therefrom, cooling said article, reheating a portion only of said article, and reforming a part of the article.

7. The process of making hollow celluloid articles which consists in first heating a sheet of celluloid, then forcing said celluloid sheet into a mold cavity, cooling said celluloid sheet and severing the surplus stock from the edge of said article, and then forming a bead adjacent the severing line.

8. The process of making hollow celluloid articles which consists in first rendering plastic all of the celluloid from which the article in a mold is to be made, forming the article, causing the celluloid to become dense while in the same mold, then causing a portion only of the formed article to become plastic, and then finishing the article while in the same mold.

9. The process of making hollow celluloid articles which consists in seating a celluloid sheet over a steam chest, bringing said sheet beneath a mold cavity, subjecting said sheet to the action of steam whereby to make it plastic and at the same time causing it to seat in said cavity subsequently cooling said seated sheet, and then cutting the surplus stock away from the article and at the same time heating the edge of the article to smooth it.

10. The process of making hollow celluloid articles which consists in seating a celluloid sheet over a mold cavity, subjecting said sheet to the action of steam whereby to make it plastic and at the same time to cause it to seat in said cavity, subjecting said seated sheet to cooling water, removing the cooling water, heating the periphery of the formed article and finishing the article.

11. The process of making hollow celluloid articles which consists in seating a celluloid sheet over a mold cavity, rendering said sheet plastic and at the same time causing it to seat in said cavity, subjecting said seated sheet to cooling water, removing the cooling water, reheating the formed article and at the same time severing said article from the sheet.

12. The process of making hollow celluloid articles which consists in seating a celluloid sheet over a mold cavity, holding said sheet adjacent the sides of said mold cavity, subjecting said sheet to the action of steam whereby to make it plastic and at the same time to cause it to be forced by the steam to seat in said cavity, subjecting said seated sheet to cooling water, removing the cooling water, heating a portion of the formed article and at the same time severing the article from the sheet, forming a bead at the periphery and then cooling the beaded part.

13. The process of making hollow celluloid articles which consists in first rendering a sheet of celluloid plastic then forcing the plastic sheet by fluid pressure into a mold cavity, and thereafter forming a bead upon the periphery of said hollow article.

14. The process of simultaneously making a number of celluloid articles which consists in first heating a sheet of celluloid, then forcing said celluloid sheet by fluid pressure into a number of mold cavities to form the articles, cooling the formed articles, severing them from the sheet, and beading the edges of the articles.

15. The process of simultaneously making a number of hollow celluloid articles which consists of heating and simultaneously seating by steam the celluloid in mold cavities to form the articles, severing the surplus stock about the periphery of the articles and reforming the articles adjacent the severing line.

16. The process of making celluloid articles which consists in placing a sheet of celluloid stock over a cavitary mold member having cutting edges, heating said stock to render it plastic, pneumatically seating said stock in the mold cavity, cooling said seated stock, and bringing thereafter a plate having a cutting edge into conjunction with the first cutting edge to sever the stock.

17. The process of making celluloid articles which consists in placing a sheet of celluloid stock over a cavitary mold member having cutting edges, heating said stock to render it plastic, pneumatically seating said stock in the mold cavity, cooling said seated stock, reheating a portion of said heated stock, bringing a hot plate having a cutting edge and a groove adjacent the cutting edge into conjunction with the first cutting edge to sever the stock and to cause the said groove to form a bead on the periphery of the hollow article.

In testimony whereof, I hereunto affix my signature.

FRED THOMAS ROBERTS.